United States Patent Office 3,491,239
Patented Jan. 20, 1970

3,491,239
X-RAY IMAGE AMPLIFIER SYSTEM WITH AUTOMATIC EXPOSURE CONTROL
Harold J. Dalman, Brookfield, Wis., assignor to General Electric Company, a corporation of New York
Filed Sept. 22, 1965, Ser. No. 489,285
Int. Cl. H05g 1/28, 1/38
U.S. Cl. 250—95     1 Claim

ABSTRACT OF THE DISCLOSURE

A camera records the optical images from an X-ray image intensifier. Current through the intensifier is integrated over an exposure interval and a signal is produced that is proportional to average image brightness during the interval. The signal is compared with an opposite polarity signal which is set to correspond with desired film density. When the difference between signals reaches zero, the exposure is terminated instantly by a resulting blanking signal that is applied to the intensifier. Hence, the latter serves as a fast shutter. Logic circuits control turn-off of the X-ray tube, cause the camera shutter to close and initiate film advance in the camera quickly after blanking. They also recondition the circuitry for allowing exposure of the next film frame without delay.

---

This invention relates to means for obtaining a desired film density in connection with photographing a bright and minified light image on the output phosphorescent screen of an X-ray image converter tube. Tubes of this type are adapted to convert an image modulated X-ray beam to a light image which is in turn converted to an amplified electron image and then to a light image again.

Present practice is for the radiologist to select the proper exposure factors that he judges will produce the desired film blackening or density for obtaining maximum diagnostic information. The usual factors are the voltage on the X-ray tube, which governs pentrating power; filament voltage, which governs electron emission and hence X-ray intensity; and, exposure time interval which is reciprocal with intensity of the X-rays. These factors are selected to some extent in dependence on the type of film that is used and the development procedure to which it will be subjected. In any event, it is evident that judgment must be exercised in order to produce a satisfactory film. The process is complicated, however, by the fact that various regions in a part of a body being examined will have different densities or X-ray transmission, in which case some areas of the film may be overexposed or too dim while other areas may be underexposed or dazzling bright when projected or otherwise viewed.

Heretofore, satisfactory average film density depended not only on the choice of X-ray penetrating power and intensity but, in addition, it was critically dependent on the duration of exposure. Duration, on the other hand, was not adequately controlled because of the uncertainty and variability of the X-ray tube switching circuits and of the operating time of the shutter and film advance mechanisms in the camera.

The main object of the present invention is to eliminate the above-cited problems by providing automatic exposure control which produces correct average film density and which enables programming the X-ray control and camera for a single exposure or for a rapid sequence of exposures.

Expressed in another way, an object of the invention is to govern film density by integrating the average light intensity and deriving electric signals that terminate exposure in relation to film density rather than depending on a proper combination of manually selected exposure factors.

Another important object is to initiate the next in a series of photographic exposures immediately after film advancement in the camera has been completed, so that there is no time delay, such as might be caused by waiting for contactors to operate or other conditions to be established, and in that way obtaining the maximum number of pictures per unit time.

Figure 1:
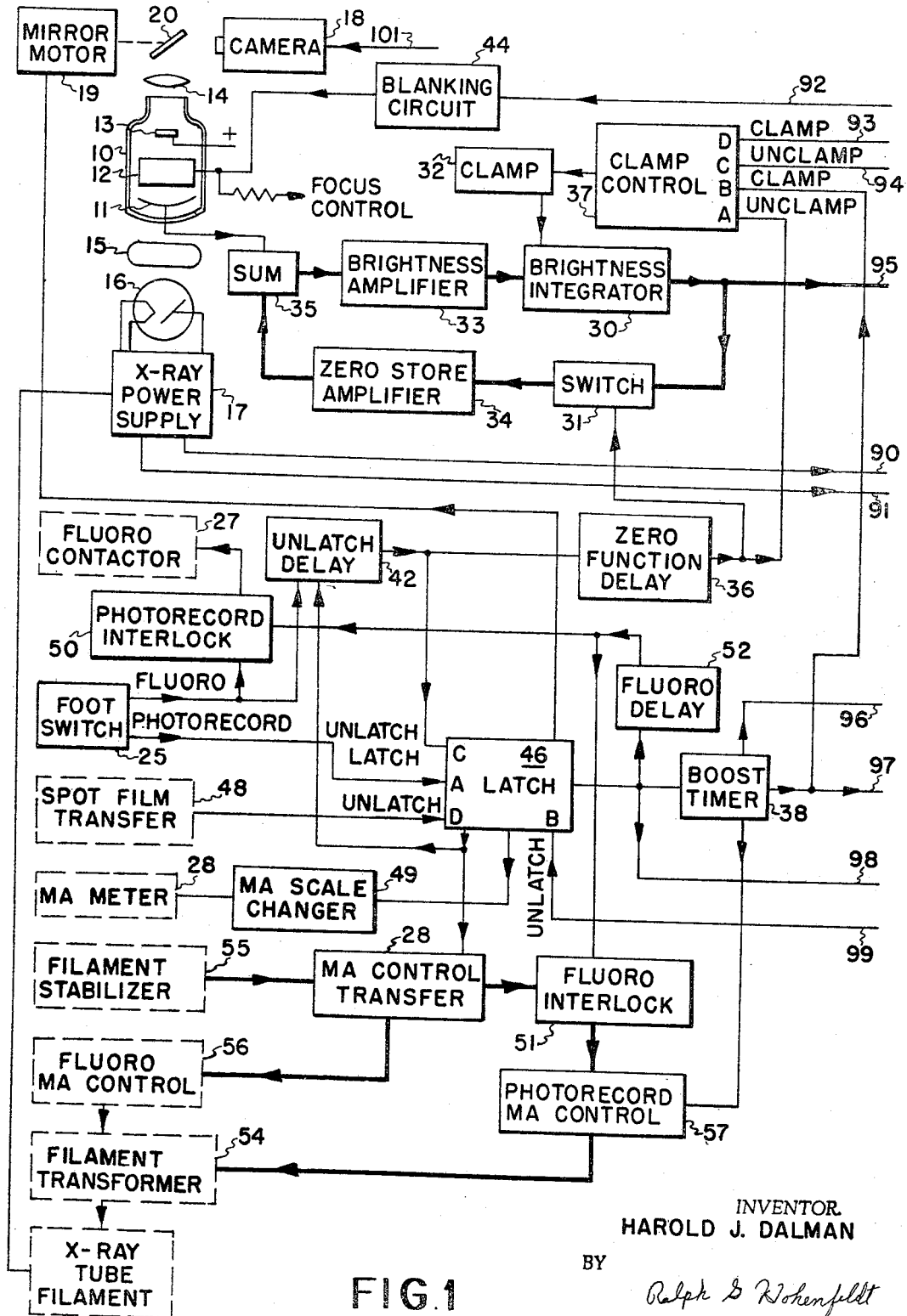
Figure 1A:
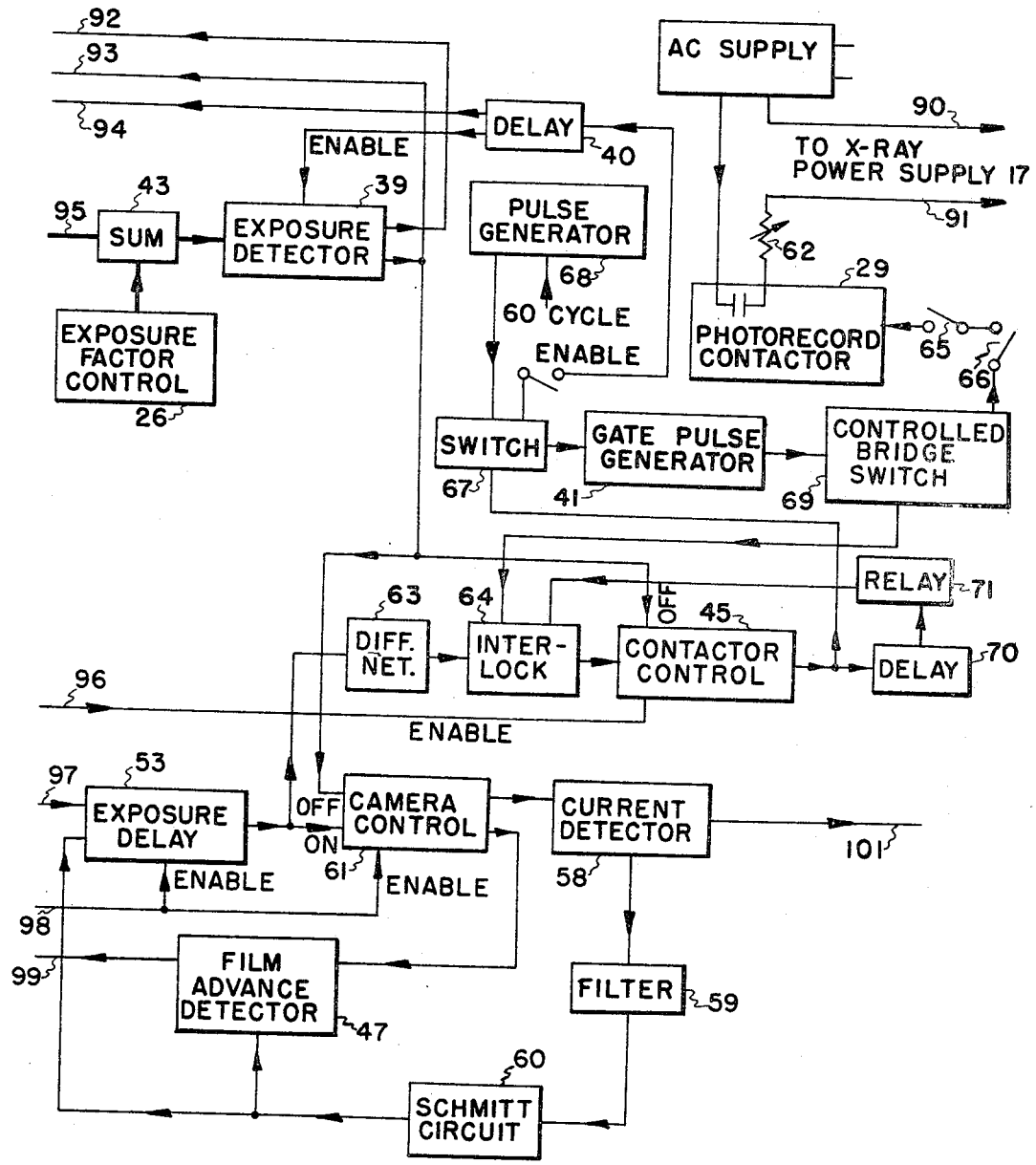

Achievement of the foregoing and other specific objects will appear throughout the course of the ensuing description of the invention which is addressed to those who have that level of knowledge which attends making or using X-ray diagnostic systems that employ image amplifiers The invention will be described in reference to the drawing which is a unitary schematic representation of the invention but is divided into two sheets (FIGURES 1 and 1A) that may be related by noting that like reference numerals are applied to interconnecting conductors.

The diagnostic system is adapted for fluoroscopy or direct viewing of the intensified image in the converter tube and also for taking one or a series of pictures of the image after the area of interest is selected by fluoroscopy. For those purposes there is provided an X-ray image amplifier tube 10 having a photocathode 11, a control and focusing electrode 12, a phosphor screen 13 on which a miniature but bright image appears and a lens 14 that is part of an optical system, not shown, which permits direct viewing of the screen 13. The screen 13 may be positive or at anode potential with respect to the photocathode 11. When the latter is excited by an X-ray image it emits electrons that are focused and made more energetic by electrode 12. Making electrode 12 negative with respect to the photoemissive cathode 11 blanks the image tube and, according to the invention, blanking of the image tube is in preference to trying to cut off an X-ray contactor to terminate an exposure because a margin of safety has to be allowed in view of such contactors being somewhat unpredictable.

For convenience, the fluoroscopic mode of operation will be referred to hereafter as "fluoro." In this mode, an object 15, which may be a patient's body, may be viewed directly through objective lens 14 above the image amplifier tube 10 when the X-ray tube 16 is turned on by way of its power supply 17 being energized. When the operator has observed something of interest which he desires to record photographically, he may take measures immediately to energize a camera 18. Upon this event, a motor 19 inserts a diagonal mirror in the optical path so that the image is deflected into photorecording camera 18 or other device such as a television camera from the monitor of which, not shown, recordings may be made. Thus, in this description, the alternative to the fluoroscopic mode will be referred to as the photorecording mode.

General Description

In normal use of the system the operator selects an X-ray tube voltage, called kvp., to indicate peak kilovolts on the radiographic station of the control at which photorecordings are to be made and an X-ray tube current, called ma. for milliamperes, at which fluoroscopy is to be done. He will also select a fluoroscopic kvp. level if an independent fluoro kvp. station exists. A two stage foot switch controls both fluoro operation and photorecording operation. The entire procedure is very nearly the same as that used for conventional fluoroscopy and spot filming except that the second stage of the foot switch instead of the cassette release is actuated. The photorecording exposure is made using the small focal spot of the X-ray tube.

A 35 mm. camera 18 with electrically operated shutter and film advance mechanism is used. It is operated in the "bulb" mode and shutter closure starts after exposure is complete. Film is advanced each time the shutter closes. The motor 19 driven mirror 20 is moved into place over the objective lens 14 when the foot switch 25 is in the photorecord position.

The image tube 10 is blanked to terminate the exposure. This is done by applying a negative potential to the focus element 12 of the tube which normally operates at a low positive potential. The flow of electrons from the photocathode 11 is cut off by the resulting negative field between the cathode and anode 13. If there are multiple focusing electrodes, the negative potential may be applied to one or more of them. Neither the camera shutter nor the X-ray contactor are used to terminate exposure because of the excessive time lag involved. The time lag involved with image tube blanking is only .001 of a second which places a minimum practical limit of .004 to .005 second on exposure time.

In the X-ray image intensifier tube 10 the X-ray image emanating from the subject 15 is converted to a light image in the primary fluorescent screen associated with photocathode 11. This light image is converted to an electron image by the photocathode surface which covers the fluorescent screen. The emitted electrons are accelerated through a high potential field and focused on the output surface where the electron image is converted to a light image by the output phosphor 13. The average (area) brightness of the visible output image is directly proportional to the emitted cathode current. The time integral of the cathode current will then be proportional to the total emitted light flux or exposure to which the film in the camera 18 is subjected. The exposure is complete when the integral reaches a preset level determined by the setting of the exposure factor control 26 which is primarily set in accordance with desired film density.

During fluoroscopic operation no part of the automatic exposure control, AEC, system is utilized. Ma. levels of the X-ray tube 16 are determined by the X-ray control and the fluoroscopic contactor 27 if the control is in normal operation. During photorecording, ma. control is transferred to the AEC system and the fluoroscopic contactor 27 is interrupted. A synchnonous contactor system in the AEC comprising photorecord contactor 29 parallels the radiographic contactor, not shown, in the X-ray control to provide on-off X-ray control to start the photo exposure and to terminate radiation during the time the image tube 10 is blanked.

The functional sequence involved in a single shot exposure is as follows:

(1) Foot switch 25 is actuated momentarily to the photorecord position and returned to the "fluoro" position.

(a) Fluoroscopic contactor 27 is interrupted.
(b) Ma. control transfers to AEC and X-ray tube filament boost toward about 90 ma. begins.
(c) Mirror 20 moves into position.
(d) Ma. meter 28 scale is changed from the "fluoro" scale to a higher scale on which the recommended 25 ma. photorecord level can be read.

(2) After .15 second, X-ray tube 16 filament temperature reaches 25 ma. level and boost ends. Filament excitation changes to a fixed 25 ma. level.

(a) Camera 18 shutter begins to open.
(b) .1 second exposure delay starts.

(3) After .1 second exposure delay to allow the shutter to open, the photorecord contactor 29 is energized and exposure begins.

(4) After an integrator 30 indicates exposure is complete:

(a) Image tube 10 is blanked to terminate exposure.
(b) Photo contactor 29 is de-energized.
(c) Camera 18 shutter closes and film advance begins.
(d) Mirror 20 returns to "home" position.

(e) Ma. control is transferred to the X-ray control "fluoro" station 56.
(f) Ma. meter 28 changes to "fluoro" scale.

(5) After .25 second delay following exposure completion the fluoroscopic contactor 27 is energized and "fluoro" operation is resumed.

Assuming that the actual exposure requires about .1 second, the total time lapse between "fluoro" interruption and "fluoro" resumption is about .6 second, a single exposure will occur if the foot switch 25 is returned to the "fluoro" position before film advance is complete. If film advance is in process at the time the foot switch is returned to the "fluoro" position, "fluoro" operation will resume .25 second from that time.

A sequence of exposures is made simply by holding the foot switch 25 in the photorecord position. In this event the above sequence progresses through step (4c) above. The mirror 20 remains in position, the X-ray tube filament temperature remains at the 25 ma. level and the ma. meter 28 remains on the higher scale. When film advance is complete, exposure delay is started immediately and the shutter is opened for the next exposure of the sequence. The cycle between (2c) and (4c) continues to repeat until the foot switch 25 is returned to the "fluoro" position at which time the remainder of the functional sequence is completed. Of course, if the foot switch 25 is returned to the "off" position rather than the "fluoro" position, step (5) ("fluoro" resumption) does not occur.

The AEC system is interlocked so that during conventional spot filming the photorecord sequence cannot be started or it will be interrupted if in progress.

To meet safety requirements it must not be possible to sustain X-radiation indefinitely when the foot switch 25 (or other hand switch) is not actuated. However, good AEC operation requires that an exposure which has been started be completed even though the foot switch has been returned to the "off" position. To satisfy both conditions, a 2 second delay is used to permit completion of the exposure with the foot switch 25 in the "off" position.

The delay mechanism maintains the AEC system in the "fluoro" status which would normally exist if the foot switch 25 had been returned to the "fluoro" position. The delay is started only if the foot switch reaches the "off" position before exposure is complete. If the delay has been started, it will be terminated when film advance begins. If exposure is not complete at the end of the delay interval, exposure will be terminated prematurely at that time.

Functional block diagram

The AEC system might logically be split into six basic functional elements: brightness integration, exposure control, latch, ma. control, camera control and contactor control. Discussion of the functional block diagram will follow this breakdown.

The block diagram shows all essential functions except the power supplies. Functional blocks shown in phantom are existing circuits in conventional X-ray controls which are utilized with AEC.

Most of the signals involved in the signal flow paths shown in the block diagram are binary in nature. That is, they exist in one of two permissible states such as "on" or "off," "zero" or "positive," "zero" or "negative," or "positive" or "negative." These signals are used in logic functions and in system programming and control.

The flow paths of variable signals where information is contained in signal amplitude are indicated by heavy bold lines. These signals are present in the brightness system where amplitudes will vary with image brightness, exposure level and zero requirements. In the ma. control system the signals are considered variable in that amplitude of the current is of importance and in that the particular level is adjustable.

Brightness integration

Integration of the image tube cathode current in integrator 30 provides a signal which is proportional to, accumulated film exposure and which is suitable for use in controlling exposure duration so that correct film density is achieved on each frame of film. Proper function of the integration system requires that a zero reference be established with X-rays off and that the integrator 30, which is an operational amplifier, be reset between exposures. The switch 31 and clamp 32 control the zeroing and resetting action.

Image tube 10 cathode current is first converted to a voltage signal by the brightness amplifier 33 before integration is performed. The output of the integrator 30 is applied to the input of a zero storage amplifier 34 through the switch 31. With X-rays off, the switch 31 is "on" and the clamp 32 is "off" and a degenerative closed loop consisting of the zero storage amplifier 34, the brightness amplier 33, and the integrator 30 is formed. The loop functions to maintain output potential of the integrator 30 at a steady potential near zero volts.

The zero reference potential which is the output of zero storage amplifier 34 and the image tube 10 cathode signal are summed in a summing circuit 35 at the input of the brightness amplifier 33. As a result, any leakage in the image tube cathode circuit is zeroed out.

When X-rays are "on" it is necessary to stop the zero action and to store the zero reference potential which was established so that signal corresponding to image brightness is not zeroed out. The action is accomplished by opening the switch 31 at the zero store amplifier 34 input. The output potential of the zero store amplifier 34 then remains fixed at the level reached prior to switch 31 opening. The switch 31 is controlled by the zero function delay 36 output.

The integrator 30 is clamped during "fluoro" operation and its output remains at zero.

The clamp 32 resets the integrator 30 and is driven by the clamp control 37 which processes various input from the AEC system to determine if the integrator 30 should be in clamped or unclamped operation. The integrator 30 is unclamped during "off" conditions and during photorecord exposure. It is clamped during "fluoro" operation and between sequential exposures.

The clamp control 37 has four inputs which are labeled "clamp" or "unclampd." Each input can accomplish only the action indicated Thus, if the clamp control 37 is switched to the "clamp" state by an input it can be returned to the "unclamp" state only by one of the "unclamp" inputs. The clamp control 37 functions as a "flip-flop" in that it remains in the state to which it was last driven if all inputs change to non-driving states. The "unclamp" input A from the zero function delay 37 overrides the "clamp" input B from the X-ray tube filament boost timer 38. Also, the "clamp" input D from an exposure detector 39 overrides the "unclamp" input C from the delay 40.

When the foot switch 25 is in the "off" position, the A input is "unclamp," B is "clamp," C is "clamp "and D is "unclamped." Since only A and B are in driving states and since A overrides B, the clamp control 37 is in the "unclamp" state driven by input A.

When the foot switch 25 is actuated to the "fluoro" position, input A changes to the non-driving "clamp" state. Input B which is in the "clamp" state then drives the clamp control 37 to the "clamp" state.

If the foot switch 25 is actuated to the photorecord position, the clamp control 37 is programmed through the exposure sequence as follows:

(1) For .15 second, input B from the boost timer 38 remains in the "clamp" state and holds the clamp control 37 in the "clamp" state.

(2) When the .15 second filament boost interval is over, input B changes to the "unclamp" state but since all inputs are then in non-driving states, the clamp control 37 will remain in the "clamp" state. This condition exists for about .1 second while the camera 18 shutter opens.

(3) After the .1 second interval the contractor system is energized and input C which is derived from the gate pulse generator 41 through the delay 40 changes to the "unclamp" state driving the clamp 32 to the "unclamp" state. This transition is delayed for about 12 milliseconds by the delay 40 so that the integrator 30 remains in the "clamped" state during switching in the contactor system to eliminate influence of transients on integrator 30 output signal. The contactor 29 requires 25 milliseconds (1½ cycles) to pick up after energization so that the integrator 30 is "unclamped" about 13 milliseconds prior to actual contactor 29 closure and X-ray production. Input C remains in the "unclamp" state until contactor 29 de-energization occurs after exposure completion.

(4) When exposure is complete, input D from the exposure detector 39 changes states for about 80 milliseconds, that is, during the image tube 10 blanking interval, and drives the clamp control 37 to the "clamp" state. In so doing the D input overrides the C input which is kept in the "unclamp" state by the delay 40 for a short time following turn off of the gate pulse generator 41.

(5) If a sequence is being made by holding the foot switch 25 in photorecord position, all inputs to the clamp control 37 will be in nondriving states following completion of the blanking interval and the clamp control 37 will remain in the "clamp" state. Input C will then "unclamp" at the start of the next exposure.

(6) If the foot switch 25 is returned to the "fluoro" position, "unclamp" input C from the boost timer 38 will change to the "clamp" state and maintain the integrator 30 in the "clamped" state during the "fluoro" operation which follows.

When the foot switch 25 is returned to the "off" position, integrator 30 zeroing action must be resumed. However, this action must not be started immediately if an exposure is in process or has just been completed. When the image tube 10 is blanked to terminate an exposure, the blanking signal is coupled through interelectrode capacity into the cathode circuit and the brightness circuits. If zero action was permitted during this time an incorrect zero reference would be established. Film density would be in error if a second exposure was started before correct zero reference was eventually developed.

To permit the blanking signal to completely die out before zeroing begins, switch 31 "turn on" and clamp control 37 "unclamp" by input A is delayed .5 second by the zero function delay 36. The input to the zero function delay 36 is a signal from the unlatch delay 42 which indicates the status of the foot switch 25 and the exposure process. This input signal is "on" when the foot switch 25 is in "fluoro" or photorecord or when an exposure is in process. During the "on" condition, zeroing does not occur. When the signal changes from "on" to "off" delay occurs and zeroing is resumed after the .5 second delay interval. No delay occurs in the "off" to "on" transition, when the foot switch 25 leaves the "off" position, and the switch 31 is opened immediately.

Exposure control

The outputs of the integrator 30 and the exposure factor control 26 are combined in a summing network 43 and applied to the input of the exposure detector 39. The exposure factor control 26 output is a fixed negative potential having an amplitude dependent on the setting of the said control dial, not shown. Signal output from the integrator 30 is a positive going potential proportional to the time integral of brightness. When the summed input signal to the exposure detector 39 passes through zero, an output pulse is generated by the exposure detector 39 to indicate exposure completion. The exposure detector 39 outputs serve four functions:

(1) The blanking circuit 44 is actuated to terminate film exposure.

(2) The clamp control 37 is triggered to reset the integrator 30.

(3) The contactor control 45 is turned off to terminate radiation.

(4) The camera control 61 is turned off to close the shutter and advance film.

The exposure detector 39 must be enabled before an output pulse can be generated. This enabling signal is developed from the gate pulse generator 41 by the delay 40. Enabling occurs about 15 milliseconds prior to contactor 29 closure.

The enabling system exists for two reasons. First when the integrator 30 is in the "zero" mode, a regenerative loop would exist consisting of the exposure detector 39, blanking circuit 44, image tube 10, interelectrode capacity and the brightness system 30, 31. If the exposure detector 39 were enabled during this time, the loop could be shocked into oscillation by a transient or by turning power supplies on. In this event proper zero reference could not be established by the zero store amplifier 34. Second, it is desirable to maintain the exposure detector 39 in an inoperable state during the preparatory portion of the exposure cycle when transient producing switching occurs in the filament, camera and contactor circuits. Actuation of the exposure detector 39 by a transient would result in undesirable termination before the exposure starts.

The duration of the exposure detector 39 output pulse is about 80 milliseconds. This then is also the duration of the blanking pulse applied to the image tube 10 by the blanking circuit 44. This time is adequate to maintain the image tube 10 cut-off during the time required to terminate radiation after exposure is complete. The drop-out time of the contactor 29 will vary between 16 and 25 milliseconds depending on the phase of the power line at the time exposure is complete.

Enabling of the exposure detector 39 is terminated when the blanking interval is over.

Latch

The electric latch 46 is probably the most central logic element in the AEC system. Its state dictates when photorecord operation will start or stop. It unitizes system function by always programming an exposure cycle to completion regardless of when the foot switch 25 photorecord position is interrupted.

The latch 46 functions much as the name implies. When the foot switch 25 is actuated momentarily to the photorecord position the latch 46 is driven to the "on" state (latched) by input A and remains so until driven to the "off" state (unlatched) by one of the inputs. The unlatch inputs are B from the film advance detector 47, C from the unlatch delay 42 and D from the spot film transfer 48. Each input can drive the latch 46 only to the state indicated. If all inputs are in nondriving states the latch 46 remains in last state to which it was driven.

Latch 46 input A from the foot switch 25 and unlatch input B from the film advance detector 47 are mutually exclusive in their driving states. If input A is in the "latch" state, input B cannot unlatch. Likewise, if input B is in the "unlatch" state input A cannot latch. Unlatch inputs C and D will override latch input A so that the system will always be "unlatched" if the spot film transfer 48 is actuated or if the unlatch delay 42 terminates.

When the latch 46 is driven to the "on" state to start an exposure cycle its outputs perform the following:

(1) The mirror drive 19 is energized.
(2) The ma. scale changer 49 is energized.
(3) The unlatch delay 42 is activated.
(4) The ma. control transfer 28 is switched.
(5) The boost timer 38 is started.
(6) The photorecord 50 interlock and the "fluoro" interlock 51 are energized through the "fluoro" delay 52.
(7) The exposure delay 53 and camera control 61 are enabled.

The latch 46 is normally driven to the "off" state, to conclude camera operation, by input B from the film advance detector 47 when exposure is complete and film is being advanced.

Since input B cannot unlatch if input A is in the "latch" state, the conditions for "unlatch" are that the foot switch 25 be in the "fluoro" or "off" position when film is being advanced. The unlatch signal is continuous during film advance and unlatch will occur if the foot switch 25 is returned to "fluoro" or "off" at any time prior to completion of film advance. This logic results in termination of photorecord operation only at the end of an exposure cycle.

If the latch 46 has been switched "off" during film advance, it cannot be latched again by the foot switch 25 until film advance is complete. This characteristic is necessary to prevent system "hang up" produced by triggering the camera control 61 (through boost timer 38 and exposure delay 53) for an additional exposure before film advance is complete. In the event that the foot switch 25 is returned to the photorecord position before film advance is complete, the latch 46 will remain in the "off" state until film advance is complete and input B assumes the non-driving state. It will then be driven to the "on" state by input A and a new photorecord cycle beginning with filament boost will be initiated.

The unlatch delay 42 provides a means for completing a photorecord exposure cycle once it has been started even though the foot switch 25 has been returned to the "off" position. Such a situation could easily occur when an operator makes single exposures and inadvertently returns the foot switch 25 to the "off" position after momentary actuation of the photorecord position. Also in terminating a sequence of exposures, the "off" position may be reached while an exposure is in progress.

Latch 46 input C is an unlatch signal derived from the "off" position of the foot switch 25 and the occurrence of this unlatch signal may be delayed up to 2 seconds by the unlatched delay 42.

Without the delay action the latch 46 would be driven to the "off" state by input C as soon as the foot switch 25 is returned to the "off" position. If an exposure were in process, it would be terminated prematurely by contactor 29 drop-out produced by disenabling the contactor control 45 through reset of the boost timer 38. By delaying this unlatch signal the system continues to function as though the foot switch 25 was in the "fluoro" rather than "off" position. The exposure cycle then continues and the latch 46 remains "on" until unlatched by input B when film advance begins. The exposure cycle then stops at the completion of film advance.

The delay action of the unlatch delay 42 is initiated by an output from the latch 46 itself. Whenever the latch 46 is "on," delay action will occur if the foot switch 25 is turned "off." Delay action is terminated by the latch 46 when the latch is driven to the "off" state by unlatch input B.

If the exposure does not complete, the unlatch delay 42 output switches to the "unlatch" state at the end of the 2 second delay interval and drives the latch 46 to the "off" state. The system then reverts to "off" conditions. The camera shutter is closed and film is advanced. The image tube 10 is not blanked nor is the contactor control 45 driven to the "off" state by the exposure detector 39. Contactor 29 drop-out is accomplished through the contactor control 45 enabling circuit which reverts to the unenabled state when the boost timer 38 is reset by the latch 46 at the end of the unlatch delay interval.

The output of the unlatch delay 42 also drives the zero function delay 36. Through this arrangement integrator 30 zeroing does not occur until .5 second after the foot switch 25 is returned to the "off" position and the latch 46 has switched to the "off" state indicating that an exposure has been normally completed or has been terminated by the unlatch delay 42. In either case brightness signal will be zero when zeroing action begins.

Ma. control

The ma. level is increased during photorecord operation so that reasonably short exposure times can be achieved. Series resistance in the filament transformer 54 primary is changed to produce the desired ma. level.

During "fluoro" operation the output of the filament stabilizer 55 is routed through the ma. control transfer 28 of the AEC to the "fluoro" ma. control 56 circuit of the X-ray control. The series resistance introduced by the "fluoro" ma. control 56 determines the "fluoro" ma. level.

When the foot switch 25 is actuated to the photorecord position, the latch 46 energizes the ma. control transfer 28. The filament stabilizer 55 output is then routed through the "fluoro" interlock 51 to the photorecord ma. control 57. The resistance in the photorecord ma. control 57 determines the ma. level during photorecord operation. The recommended level is 25 ma. in this example.

When the latch 46 is driven to the "on" state, the "fluoro" delay 52 is energized. The output of the "fluoro" delay 52 drives the photorecord interlock 50 and the "fluoro" interlock 51. The photorecord interlock 50 de-energizes the "fluoro" contactor 27 which otherwise would remain closed with the foot switch 25 in the photorecord position. X-rays are then off at the beginning of the exposure cycle. The "fluoro" interlock 51 and the photorecord interlock 50 are contacts on the same relay and one is open when the other is closed. The arrangement assures that the "fluoro" contactor 27 cannot be energized at the same time that the X-ray tube filament is at the photorecord operating temperature.

The response time of the X-ray tube 16 filament (small spot) is such that about .7 second is required for the temperature to reach the photorecord level after filament transformer 54 primary resistance is changed. To improve the response time so that exposure can start in .3 second after photorecord actuation, a boost system is used in the filament transformer 54 primary circuit. The boost system consists of reducing the primary resistance for a short time to a value which would produce a steady-state ma. level somewhere between 75 and 100 ma. in this case. This condition raises the X-ray tube filament temperature to the 25 ma. level in .15 second at which time the primary resistance is switched back to the 25 ma. value and is maintained at that level until the latch 46 returns to the "off" state at the end of the exposure sequence.

The time that the photorecord ma. control 57 is in the "boost" state is controlled by the booster timer 38. When the latch 46 is driven to the "on" state by the foot switch 25, the boost timer 38 interval is started and resistance in the photorecord ma. control 57 is at the boost value. The boost timer 38 changes state after .15 second and increases the resistance in the photorecord ma., control 57 to the operating value which maintains the filament temperature at the 25 ma. level.

The boost level is adjusted so that the exposure time of the first exposure in a sequence is the same as that of succeeding exposures. Adjustment is accomplished by setting the resistance in the photorecord ma. control 57 circuit.

When the foot switch 25 has been returned to the "fluoro" position after photorecord operation so that "fluoro" operation will be resumed, energization of the "fluoro" contactor 27 by the foot switch 25 through the photorecord interlock 50 is delayed .25 second so that the filament can cool down considerably from the 25 ma. level before starting "fluoro" operation. This delay action is caused by the "fluoro" delay 52. The delay interval starts when the latch 46 changes to the "off" state. The photorecord interlock 50 closes after the .25 second delay is complete and the "fluoro" contactor 27 will then be energized if the foot switch 25 is in the "fluoro" position. Since the latch 46 drives the ma. control transfer 28, the filament begins cooling to the "fluoro" level at the start of the .25 second "fluoro" delay interval. Thus, if the foot switch had been actuated from "fluoro" to photorecord and returned to "fluoro" before exposure was complete, the image cycle would have been "fluoro," off for about .3 second, exposure at 25 ma., off for .25 second, and "fluoro."

Full scale "fluoro" levels on the control ma. meter 28 are generally about 10 or 12 ma. which is not adequate for metering during photorecord operation. The ma. scale changer 49 is added to the X-ray control to change the meter to a higher scale (generally 60 ma.) when photorecord operation is in progress. The ma. scale changer 49 is controlled by the latch 46 and the meter will be on the higher scale when the latch 46 is in the "on" state.

Camera control

The camera control system comprises the exposure delay 53, camera control 61, film advance dectertor 47, current detector 58, filter 59, and the Schmitt circuit 60. Its function is to program the shutter and film advance mechanism through single shot or sequential exposures. It provides an unlatch signal to the latch 46 at the proper time and provides signal to start the contactor system.

The exposure delay 53 and the camera control 61 must be enabled before they can function. The enabling signal is taken from the latch 46 output so that the camera system can function only when the latch 46 is in the "on" state. This enabling signal (actually the lack of it) also serves to shut down the camera system and return it to standby condition (shutter closed and film advanced) should exposure be terminated prematurely by the unlatch delay 42. Shutter closure and film advance is normally initiated by the output pulse from the exposure detector 39, however, when the unlatch delay 42 terminates exposure, no output pulse is produced by the exposure detector 39.

When the latch 46 is driven to the "on" state in photorecord operation, the exposure delay 53 and camera control 61 are enabled and ready to function. The exposure delay 53 is triggered when the boost timer 38 changes state at the end of the .15 second boost interval. The exposure delay 53 is a gate circuit and remains in the triggered state for a .1 second timed interval.

The output signal from the exposure delay 53 serves two functions. The triggered state drives the camera control 61 to the "on" state which opens the shutter of photorecord camera 18. The trailing edge of the .1 second output triggers the contactor system to start exposure, thus .1 second is allowed for the shutter to open before X-radiation is generated.

The camera control 61 can be driven only to the "on" state by the exposure delay 53 output. It will remain in the "on" state and maintain the camera 18 shutter "open" until exposure is complete and is driven to the "off" state by the output signal from the exposure detector 39. The shutter then closes and film is advanced. When film is completely advanced a mechanism, not shown, in the camera 18 opens the film drive circuit. The camera 18 is then ready for the next exposure cycle.

Drive current to the camera 18 is passed through the current detector 58 where an output signal is generated whenever the current exceeds 20 ma. as it does when the shutter is energized or the film is being advanced. The current detector 58 output is smoothed by the filter 59 and applied to the Schmitt circuit 60 where it is converted to a rectangular waveform with steep edges suitable for pulse generation. The output of Schmitt circuit 60 is applied to the exposure delay 53.

The Schmitt circuit 60 output is in the "on" state when current flows in the camera 18 circuit. With the 35 mm. camera used in the photorecord camera 18, two separate "on" intervals are generated. The first occurs while the shutter is opening. After the shutter has opened, an internal camera mechanism opens the circuit and current drops to zero producing an "off" state in the Schmitt circuit 60 until exposure is complete and film advance begins. The second "on" interval occurs, of course, during the film advance period after which the Schmitt circuit 60 again reverts to the "off" state.

The Schmitt circuit 60 functions to provide the recycling signal to the exposure delay 53 for sequence operation. It also provides one of the logic inputs to the film advance detector 47 for production of the "unlatch" signal which occurs only during the film advance part of the exposure cycle.

If at the end of the film advance interval the exposure delay 53 and camera control 61 are still enabled (latch 46 held in "on" state by foot switch 25) a pulse, produced at the exposure delay 53 input by the Schmitt circuit 60 switching from the "on" to "off" state, will trigger the exposure delay 53 and initiate a new exposure cycle. This repetition will continue as long as the latch 46 is "on." When the latch 46 is switched "off" by the "unlatch" signal from the film advance detector 47 (foot switch 25 returned to "fluoro" or "off" position) the exposure delay 53 is no longer enabled and cannot be triggered by the pulse generated from the Schmitt circuit 60 output. The exposure sequence then ends and either "fluoro" or "off" conditions will resume depending on the position of the foot switch 25.

The pulse which is produced at the exposure delay 53 input when shutter opening is complete does not affect the exposure delay 53 since it is already in the triggered state.

Since the shutter opening phase of the exposure cycle produces an "on" state in the Schmitt circuit 60, additional processing is required to produce the "unlatch" signal for the latch 46 which must exist only during the film advance portion of the cycle. If the entire Schmitt circuit 60 output were applied to the latch 46 as an unlatch signal, it would be necessary for the operator to hold the foot switch 25 in the photorecord position until the shutter is fully open; otherwise the Schmitt signal during shutter opening would "unlatch" the latch 46 which would in turn drive the camera control 61 to the "off" state through the enable circuit causing the shutter to close and film to advance without making an exposure.

The Schmitt signal is processed in the film advance detector 47 which combines the Schmitt signal with the output from the camera control 61. An "unlatch" state at the film advance detector 47 output is produced only when the Schmitt circuit 60 is in the "on" state and the camera control 61 is in the "off" state. An "unlatch" signal then is not produced during shutter opening since the camera control 61 at that time is in the "on" state.

By utilizing the camera current to detect completion of the film advance interval, sequencing can occur at the maximum possible rate depending only on exposure time, film advance time, and the exposure delay interval allowed for shutter opening. Use of an independent "clock" would necessitate extending the total cycle time so that completion of film advance would always be assured. The film advance time for the camera used is between .25 and .3 seconds.

Contactor control

Contacting in the X-ray generator primary for photo-record operation is synchronous with the power line to minimize secondary transients produced by inrush current or by interruption at undesirable portions of the line cycle. A system to that used in "fluoro" contacting cannot be used since severe kvp. regulation would occur at 25 ma. with the surge resistance in the circuit.

The contacting circuits used in the AEC system do not produce integral cycle operation as is used in conventional radiographic timing. The contacting time may be any integral number half cycles. Also, the photorecord contactor 29 may close randomly on either the positive or negative half cycle of the line with no consideration given to the polarity of the line during the last impulse of the previous exposure. The system is only adjusted to close at zero cross-over and remain closed for an integral number of impulses.

This type of contacting system has the following attributes:

(1) The 25 ma. operating level is far lower than that normally used in conventional radiography and spot film operation.

(2) As a consequence of balancing or equalizing "fluoro" kvp. and radiographic kvp. during photorecord operation a small surge resistance is added in the X-ray generator primary circuit. This comes about since radiographic kvp. station calibration is compensated for regulation which occurs at radiographic loads of 100 ma. and up. When a kvp. station is selected and operated at photorecord loads of 25 ma. or lower the actual kvp. will be too high because of a lack of road regulation. To compensate for this situation, a kvp. balance 62 resistor is added in series with the contacts of the photorecord contactor 29. The resistance is adjusted so that the regulation introduced at the photorecord load level produces the same generator primary voltage as that which exists at the same kvp. setting during "fluoro" operation at 3 ma.

The output signal from the exposure delay 53 produces a pair of pulses in the differentiating network 63 (Diff. Net.) which are applied to the contactor control 45 through the interlock 64. Only the pulse produced by the trailing edge of the exposure delay 53 signal can trigger the contactor control 45. After being triggered the contactor control 45 remains in the "on" state until driven "off" by the output pulse from the exposure detector 39.

Like the exposure delay 53, the contactor control 45 must be enabled to be functional. The enable signal is taken from the boost timer 38 and it assumes the "enable" state after completion of the boost interval. In the absence of an output pulse from the exposure detector 39 when exposure is terminated prematurely by the unlatch delay 42, the removal of the enable signal drives the contactor control 45 to the "off" state. This link between the boost timer 38 and the contactor control 45 also assures that the photorecord contactor 29 cannot be triggered should the boost system fail to terminate boost action.

When exposure is terminated prematurely by the unlatch delay 42 the contactor 29 is interrupted nonsynchronously by the contacts 65 which are controlled by the unlatch delay 42. Another set of contacts (not shown) also controlled by the unlatch delay 42 produces the "unlatch" signal. The contactor 29 input circuit is broken by the unlatch delay 42 system for radiation safety considerations. This is a reliable arrangement for assuring that radiation will not persist beyond the unlatch delay 42 interval.

The contactor control 45 drives a switch 67 at the output of the pulse generator 68. This switch 67 passes pulses when the contactor control 45 is in the "on" state.

The pulse generator 68 produce a train of short trigger pulses from a line signal at a 120 pulse per second rate. Each pulse occurs precisely at a zero cross-over point of the line waveform. These pulses when passed by the switch 67 trigger the gate pulse generator 41 which produces a 6 millisecond output pulse each time it is triggered. These 6 millisecond pulses drive the gate of a controlled rectifier in the SCR controlled bridge switch 69. The controlled rectifier fires and remains conducting during the remainder of the half cycle. A 6 millisecond gate turn on pulse is required to allow current in the inductive contactor 29 coil circuit to build up to level which will sustain conduction in the controlled rectifier anode circuit. Pull-in time of the photorecord contactor 29 is adjusted to 1½ cycles by series resistance, not shown, in the coil circuit. This adjustment also establishes drop-out time.

The photorecord contactor 29 is also connected through switch contacts 66. The purpose of contacts 66 (which are driven by the contactor control 45) is to prevent contactor 29 energization by a shorted controlled rectifier without the contactor control 45 being in the "on" state. The interlock 64 at the input to the contactor control 45 furthers this protection by not passing the input trigger signal if the interlock control 64 input from the bridge switch 69 indicates that the controlled rectifier shorted. Should the controlled rectifier be shorted, contacts 66 then will not be closed by the contactor control 45 and non-synchronous contactor closure will be prevented.

A delay 70 is inserted in the input to a relay 71, which actually operates contacts 66, to extend the drop-out time to 30 milliseconds. This added delay permits the photorecord contactor 29 coil to be de-energized synchronously by the contactor control 45 and pulse system before contacts 66 open. Between 1 and 1½ line cycles is required for the photorecord contactor 29 to open after the contactor control 45 is driven to the "off" state depending on the phase of the line at the time. If "turn off" occurs just after zero cross-over the drop-out time will be 1½ cycles since the controlled rectifier will not turn off until the end of the half cycle in which contactor control 45 turn off occurred.

A second control input to the interlock 64 is taken from relay coil 71. If the coil should be energized (by drive transistor failure) prior to normal contactor control 45 turn on, the turn on trigger pulse will be passed through the interlock 64. This essentially a "backup" feature on the controlled rectifier interlocking. If the coil circuit 71 failed, then the controlled rectifier interlock would not function since it is dependent on an open contact 66 at time of failure.

In summary, the above described invention permits obtaining a maximum number of film exposures from an X-ray image amplifier tube in any period. Each exposure duration is dependent on film density rather than on preselected exposure time as modified by inherent system variables as was the case in the past. Adding a margin of safety to any time period, such as that during which a camera shutter operates, or a film advance mechanism operates or an X-ray contactor operates, is unnecessary. On the contrary, according to the invention, the image tube is blanked simultaneously with completion of each exposure. In effect, the image tube itself acts as an extremely fast shutter and any operations that must take place at the end of an exposure or between exposures may be initiated with blanking.

The system is essentially mistake-proof in and mode and fluorographic, photorecording, radiographic and spot filming procedures may be carried on without interaction. In the recording mode the operator only needs to set desired film density on an exposure factor control. Each setting has a corresponding reference voltage. This voltage is compared with one produced by an integrator which develops a voltage during an exposure which depends on current through the image tube and, hence, on average image brightness. When desired integrated light flux is reached the exposure is terminated and the camera is reset automatically.

A latching system is provided to assure that events in a sequence occur in a desired order and that an exposure will be completed before another is started or a mode change can become effective. Current to the recording camera is detected to determine when shutter and film advance mechanism operation are complete. Using a signal so derived permits minimum delay between completion of an exposure and the start of the next in a sequence.

Although an embodiment of the invention has been described insofar as is necessary to enable one skilled in the art to which it pertains to adopt its principles, such description is to be considered illustrative rather than limiting, because the invention may be variously embodied and is to be limited only by construing the claim which follows.

It is claimed:
1. An X-ray image amplifying system with film recording means comprising:
   (a) a camera including a shutter and a film advance mechanism and electrically powered means for operating the shutter and the mechanism,
   (b) an X-ray image amplifying means including a photocathode, a focusing electrode and an output phosphor the latter of which is optically coupled with the camera,
   (c) means adapted to produce an electric signal indicative of completion of the advancement of a film to an exposure position in the camera,
   (d) said last named means comprising means for detecting the level of current flowing to the electrically powered means that operate the film advance mechanism, which level corresponds with completion of film transport whereby said signal is produced,
   (e) control means for said camera,
   (f) said control means being responsive to said signal when film transport is complete to operate the camera shutter open in preparation for the next exposure in a sequence,
   (g) means adapted to apply to said focusing electrode a voltage that is positive with respect to said photocathode for focusing said tube during operation,
   (h) voltage changing means adapted to change the voltage on said focusing electrode to a negative value with respect to said photocathode for substantially stopping electron flow to the output phosphor to reduce its brightness to substantially zero,
   (i) means for determining when a desired total light flux has reached a film in the camera,
   (j) said last named means being adapted to activate voltage changing means coincidentally with attaining the desired light flux, whereby to make said electrode more negative and blank the image amplifying means.

References Cited

UNITED STATES PATENTS

| 2,790,085 | 4/1957 | Fransen et al. | 250—65 |
| 2,853,619 | 9/1958 | DeWitt | 250—65 |
| 2,937,277 | 5/1960 | Euler et al. | 250—65 |
| 3,130,346 | 4/1964 | Callick | 315—22 |

FOREIGN PATENTS

| 692,985 | 7/1953 | Great Britain. |

RALPH G. NILSON, Primary Examiner

S. C. SHEAR, Assistant Examiner

U.S. Cl. X.R.

250—65